H. HEBERT.
LAYING HEN MARKER.
APPLICATION FILED APR. 27, 1920.
1,368,500.
Patented Feb. 15, 1921.
2 SHEETS—SHEET 1.
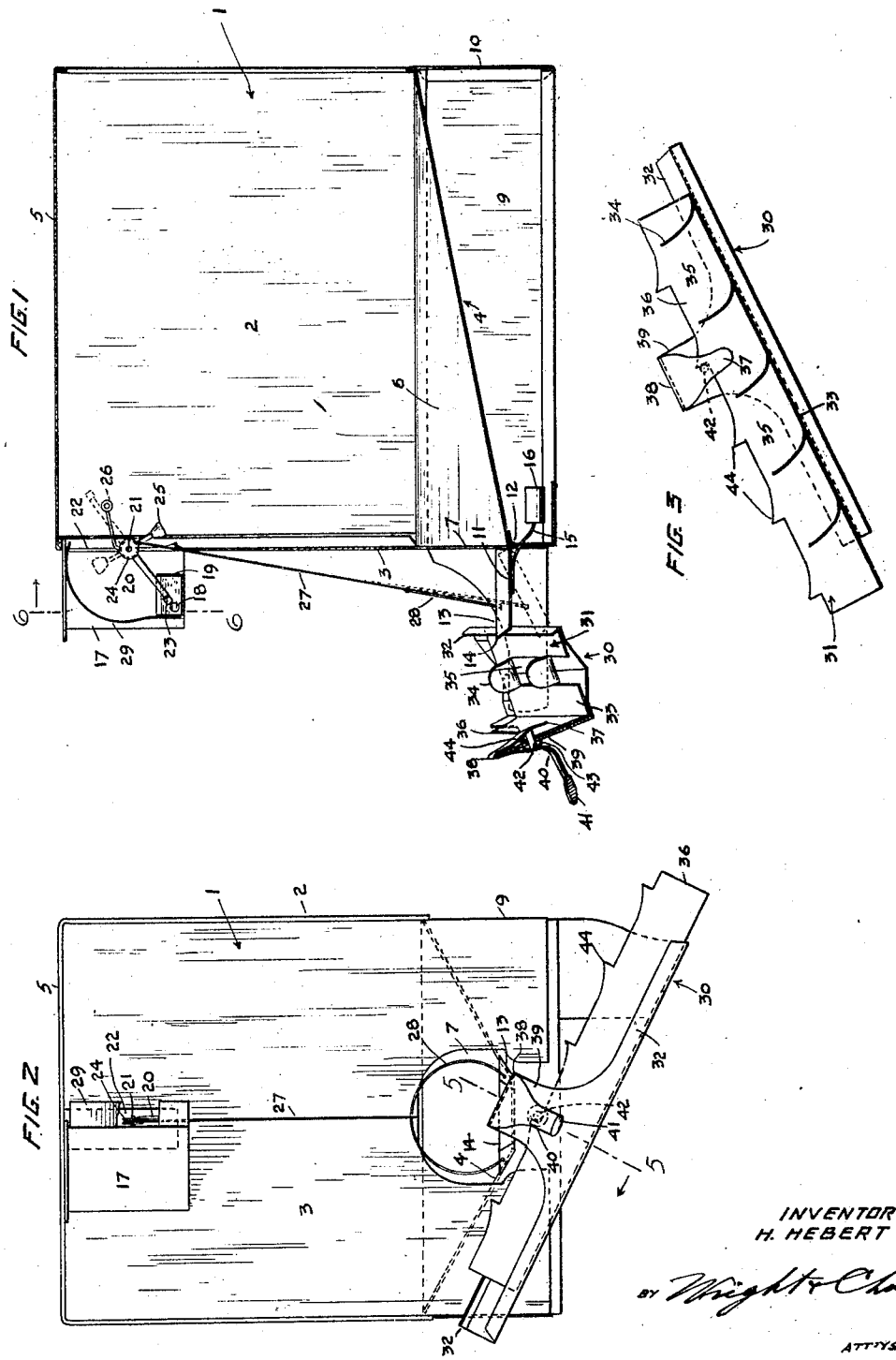
INVENTOR
H. HEBERT

H. HEBERT.
LAYING HEN MARKER.
APPLICATION FILED APR. 27, 1920.

1,368,500.

Patented Feb. 15, 1921.
2 SHEETS—SHEET 2.

INVENTOR
H. HEBERT
by Wright & Chum
ATT'YS.

UNITED STATES PATENT OFFICE.

HECTOR HEBERT, OF SAN FRANCISCO, CALIFORNIA.

LAYING-HEN MARKER.

1,368,500.

Specification of Letters Patent.  Patented Feb. 15, 1921.

Application filed April 27, 1920. Serial No. 376,999.

*To all whom it may concern:*

Be it known that I, HECTOR HEBERT, a citizen of the United States, residing at San Francisco, in the county of San Francisco and State of California, have invented new and useful Improvements in Laying-Hen Markers, of which the following is a specification.

This invention relates to an improved device for marking laying hens so that they may be readily and easily distinguished from non-laying hens.

The primary object of this invention is to provide a simply constructed and inexpensive device of the character described, which will operate in a more reliable and certain manner than marking devices such as heretofore used, due to the fact that it operates automatically by action of the egg just laid to make a distinct mark upon the back of the hen substantially simultaneously with the laying of the egg and in addition, conveys the egg from the nest immediately after the laying and automatically disposes the egg in an out-of-the-way position to permit another hen to lay an egg in the nest and the marking operation to be repeated.

The invention possesses other advantages and features, some of which, with the foregoing, will be set forth at length in the following description wherein I shall outline in full that form of the invention which I have selected for illustration in the drawings accompanying and forming a part of the present specification. In said drawings, I have shown one form of the construction of my invention, but it is to be understood that I do not limit myself to such form, since the invention as expressed in the claims may be embodied in a plurality of forms.

Figure 1 is a longitudinal vertical sectional view of the invention.

Fig. 2 is a rear elevation of the device.

Fig. 3 is a detail longitudinal sectional view of the receiving and conveying means for the eggs.

Figure 4:
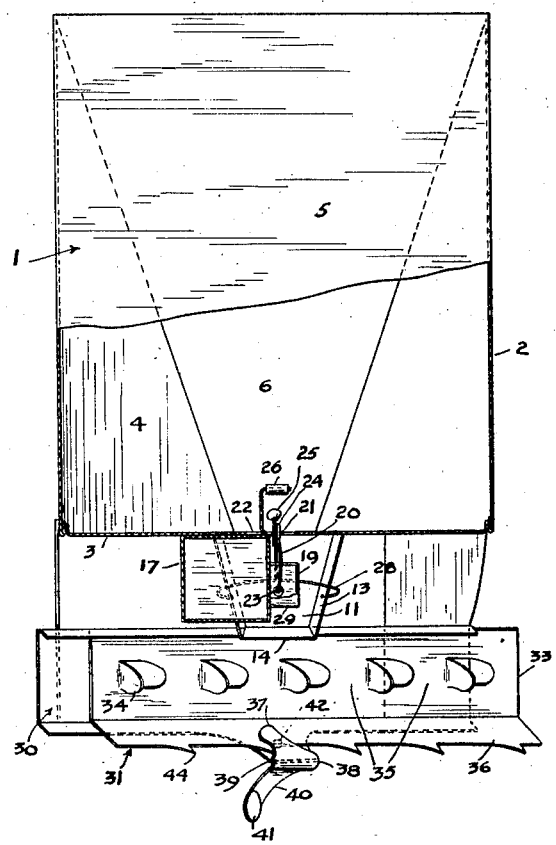
Fig. 4 is a top plan view of the invention.
Figure 5:
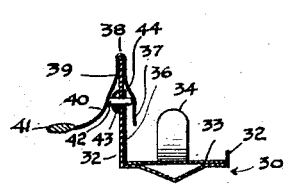
Fig. 5 is a sectional view on the line 5—5 of Fig. 2.
Figure 6:
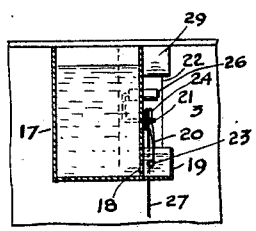
Fig. 6 is a detail sectional view taken on the line 6—6 of Fig. 1.

In carrying out my invention, I employ a nest 1 preferably of box-like construction, and which comprises side walls 2, a rear wall 3, a bottom wall 4, and a top wall 5, all suitably joined together so as to leave the front of the structure open as an entrance for the nest. The bottom wall or floor 4 of the nest is inclined, as at 6, and slopes toward an egg outlet opening 7 in the rear wall 3 so that an egg just laid will roll out of the nest through said opening. The side and back walls extend below the bottom wall and act as legs 9 to support the nest, there being a low front piece 10 secured to the side walls and which extends below the bottom wall. This nest may be of any desired construction provided it is arranged so that an egg just laid will roll out of the nest.

The means for automatically marking a hen and which is operated by the egg in rolling out of the nest comprises a depressible member or plate 11 hinged, as at 12, to the wall 4 at the lower side of the opening 7 outside of the nest. This plate is formed like a chute, having retaining flanges 13 on its sides and an upturned lip 14 on its outer edge whereby an egg is prevented from rolling sidewise and too rapidly forward off of said plate. An arm 15 secured to the under side of the plate and extending under the floor 4, carries a weight 16 on its free end, and by this arrangement, the plate is normally held in horizontal egg receiving position. The weight 16 is such that the egg will depress the plate immediately upon rolling onto the plate.

Mounted in the upper part of the nest is means for casting a marking substance on the hen, said means being operated when the plate 11 is depressed. This means comprises a marking substance container 17 secured to the rear wall 3 and has a small slow feeding opening 18 that opens into a small auxiliary container 19. This latter container holds a small quantity of the marking substance.

Mounted on the container 17 is means for picking up a small quantity of the substance and throwing it on the hen. This means comprises an arm 20 pivoted at one end, as at 21, to the container 17, and adapted to move into and out of the nest through an opening 22 in the wall 3. On the outer end of the arm is a cup 23 carried and this cup normally lies in the auxiliary container 19. At the pivoted end of the arm, a pulley 24 is mounted, and the pivot is made through said pulley. A weight 25 is fixed to the pulley 24 so as to normally hold the cup 23 in the auxiliary container 19. A suitably cushioned striker arm or abutment 26 is mounted in the nest in the path of the arm so as to be engaged by the arm and to cause the contents of the cup to be forcibly ejected downwardly toward the floor of the nest. A flexible member 27 is fixed to a bail 28 which bail is pivoted to the plate 11. This flexible member is rove around the pulley 24 and secured thereto at its upper end. A curved guard flange 29 is secured to the side of the container 17 and extends over the arm 20 to prevent the marking substance from being thrown upwardly by the arm during operation of the device.

The operation of the device is as follows: When a hen lays an egg in the nest, the egg, as soon as laid, will, owing to the inclined floor, roll out through the opening 8 onto the plate 11. The plate 11 will swing downwardly immediately and pull upon the flexible member 27. This will rotate the pulley 24 and swing the arm 20 into the nest. As the arm strikes the abutment 26 it forcibly ejects the contents of the cup 23 downwardly onto the back of the hen. This action takes place very quickly and before the hen can leave the nest, so that the hen will be certain to be marked. The mechanism returns to normal position by reason of the weights 16 and 25.

The marking substance may be liquid or semi-liquid and any color suitable for the breed of hens with which the invention is used. For black hens, the substance may be white and for white hens, a black marking substance may be used. This substance should be of a sticky form preferably but capable of being easily removed and non-injurious to the hen.

In order to move the egg, just laid, out of the way, so that the device is free to operate again and also to provide for catching and holding the egg as it rolls from off the plate 11, I provide a downwardly slanting outwardly inclined support 30 secured to the rear of the nest. An egg receiver and conveyer 31 is slidably mounted on this support and is held in place by flanges 32 on the side edges of the support. This receiver and conveyer comprises a plate 33 having upwardly struck partitions 34 which partitions are spaced apart sufficiently to receive an egg therebetween and provide a series of egg compartments 35. An upright flange 36 is formed on the outer edge of and extends the full length of the plate. Owing to the outward inclination of the support 30, the eggs will rest upon the upright flange between the partitions and will be spaced from one another.

The receiving member is mounted below the opening 7 and plate 11 so that the eggs will roll off of the plate and onto the plate 33 without dropping sufficiently to break or crack the eggs. As the egg rolls upon this plate and toward the flange 36, it will encounter a trigger 37 rockingly mounted intermediate of its ends, as at 38 upon the upper edge of an upward extension 39 of the support 30. This trigger is disposed in front of the flange 36 immediately opposite and in line with the opening 7 and plate 11, whereby it will be engaged by an egg entering the receiver. The trigger extends over the extension 39 and downwardly and outwardly, as at 40, and on its outer end carries a weight 41. The downward and outwardly extending part 40 of the lever carries a detent pin 42, which pin slides in an opening 43 in the extension 39 and normally extends in front of the extension. Ratchet teeth 44 are formed on the upper edge of the flange 36 at suitably spaced points corresponding in distance with the spacing of partitions 34. These teeth are arranged to prevent the movement of the receiver downwardly except when the trigger is pressed inwardly and moves the pin out of position to engage the teeth.

The operation of this mechanism is as follows:

When the egg rolls onto the plate 33, it engages the trigger 37 and pushes the trigger inwardly. This moves the pin 42 out of engagement with the tooth 44 which tooth has held the receiver in position, and by reason of the weight of the egg, the receiver will move downwardly. As soon as the egg has moved downwardly out of contact with the trigger, the weight 41 will rock the trigger and cause the pin 42 to move into position to engage the next tooth 44 and stop the receiver. Thus it will be seen that the receiver automatically moves a distance equal to the space between the teeth 44 when an egg is received therein and in this way another compartment 35 is brought opposite the plate 11 and the mechanism is set for another operation. By thus disposing of an egg just laid, the nest is ready for another hen and it will be seen that one nest may serve for several hens. The eggs in being received and held by the mechanism do not roll onto one another, are thus prevented from breaking or cracking, and may be easily removed as desired.

I claim:—

1. A laying hen marker comprising a nest, a container for a marking substance operatively associated with the nest and means for depositing the marking substance on a hen in the nest, actuated solely by the weight of an egg laid in the nest and independently of any movement of the hen relative to the nest.

2. A laying hen marker comprising a nest, the surface of which, on which the egg is laid, is inclined, a depression member onto which, from said surface, an egg laid in the nest will roll and depress said member, means operating when the depressible member is depressed for making a mark upon a hen on the nest, and means operated automatically by the egg and onto which the egg rolls from said depressible member, for moving the egg away from a point opposite to said depressible member.

3. A laying hen marker comprising a nest and means for making a mark on a hen on the nest actuated solely by the weight of an egg laid in the nest and independent of any movement of the hen relative to the nest.

4. A laying hen marker comprising a nest, means operated by an egg laid in the nest for making a mark upon a hen while on the nest, and means operated automatically by an egg and onto which the egg rolls from said nest for moving the egg away from the point at which the egg rolls onto said means from the nest.

HECTOR HEBERT.